June 23, 1970  P. UHLIR  3,516,267
MECHANISM FOR TRANSFORMING A UNIDIRECTIONAL ROTARY
MOTION INTO AN OSCILLATING MOTION
Filed Jan. 30, 1969  4 Sheets-Sheet 1

INVENTOR
PAVEL UHLIR
BY
Michael S. Striker
ATTORNEY

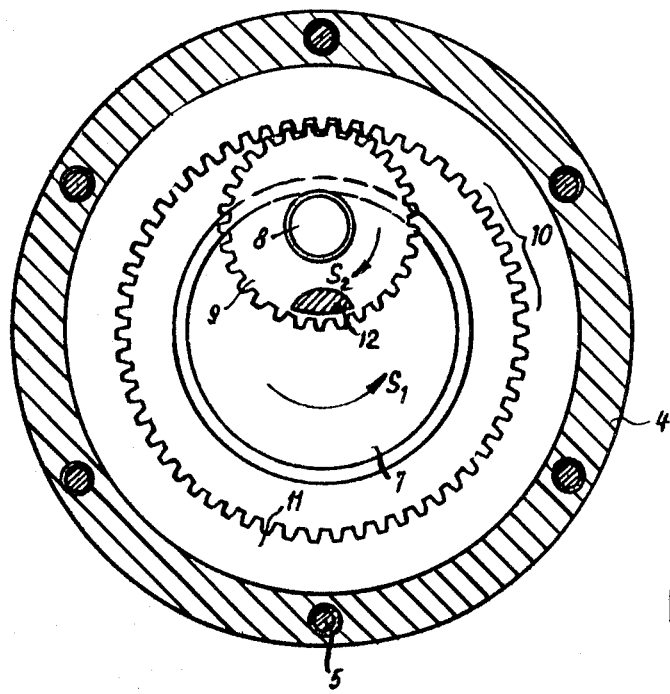
FIG. 3
FIG. 4
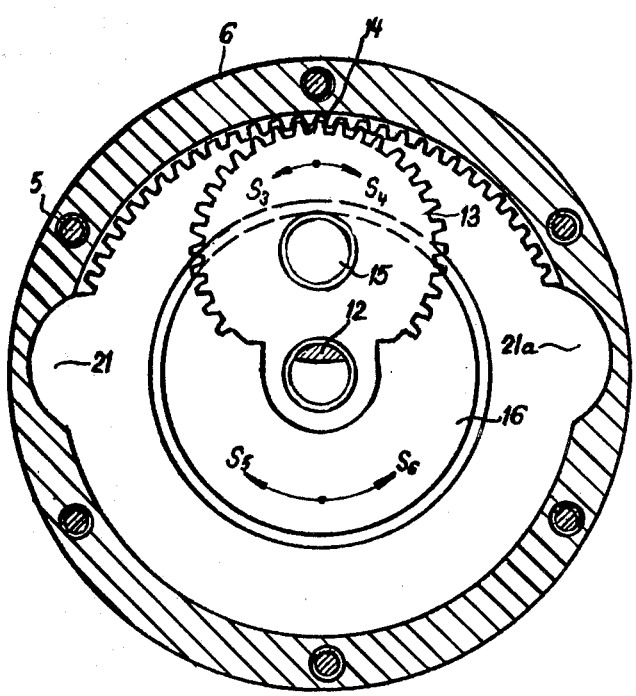

United States Patent Office 3,516,267
Patented June 23, 1970

3,516,267
MECHANISM FOR TRANSFORMING A UNIDIRECTIONAL ROTARY MOTION INTO AN OSCILLATING MOTION
Pavel Uhlir, Trebic, Czechoslovakia, assignor to Elitex Zavody Textilniho Strojirenstvi, Generalni Reditelstvi, Liberec, Czechoslovakia
Filed Jan. 30, 1969, Ser. No. 795,299
Claims priority, application Czechoslovakia, Jan. 31, 1968, 732/68
Int. Cl. D04b 9/00; F16h 21/40
U.S. Cl. 66—56                                10 Claims

ABSTRACT OF THE DISCLOSURE

A mechanism for transforming a unidirectional continuous rotary motion into an oscillating motion in which a gear on the crank pin of a crank on a drive shaft is in mesh with an internal gear ring and in which a pin projecting eccentrically from the gear engages in an eccentric recess in a gear segment on the crank pin of a second crank fixed to a driven shaft while the teeth of the gear segment mesh with the teeth of an internal gear segment so that during continuous rotation of the drive shaft in one direction said driven shaft is oscillated about its axis.

BACKGROUND OF THE INVENTION

The present invention relates to a mechanism for transforming a unidirectional rotary motion into an oscillating motion.

Such mechanisms are advantageously used in knitting machines, especially in circular hosiery knitting machines, in which the heel or toe part of the knitting is usually formed by reverse motion of a rotatably mounted needle cylinder.

A device of this type for controlling the movement of the needle cylinder of a knitting machine is known in the art which comprises a swingable gear segment, the swinging motion of which is controlled by two rotating cams and followers mounted on arms of the gear segment and engaging respectively the camming surfaces of the cams. The shape of the camming surfaces is constructed so that the gear segment performs an oscillating swinging motion and so that the needle cylinder connected by gearing to the gear segment will correspondingly perform an oscillating rotary motion about its axis. The construction may be made in such a manner that the needle cylinder is rotated through a major part of its rotary motion in one or the other direction with a maximum admissible rotational velocity, and this maximum rotational velocity abruptly drops down to zero when the rotary motion of the needle cylinder is reversed.

Other devices are also known for transforming a unidirectional rotary motion into a cyclically reversed rotary motion of a needle cylinder.

All devices of this type known in the art have, however, a common disadvantage in that the various elements of the devices are stressed to a considerable degree during reversing of the direction of rotation of the needle cylinder.

It is an object of the present invention to overcome these disadvantages of devices of the aforementioned type known in the art.

It is a further object of the present invention to provide for a device of the aforementioned kind which is composed of few and relatively simple parts so that the device may be manufactured at reasonable cost and stand up perfectly under extended use.

SUMMARY OF THE INVENTION

With these objects in view, the mechanism according to the present invention for transforming a unidirectional continuous rotary motion into an oscillating motion mainly comprises a rotary drive shaft and a driven shaft turnably mounted on support means, first crank means fixed to the drive shaft and having a first crank pin eccentrically arranged with respect to the axis of the drive shaft, second crank means fixed to the driven shaft and having a second crank pin eccentrically arranged with respect to the axis of the driven shaft, a gear coaxial with the first crank pin and freely rotatably mounted thereon with the teeth of the gear meshing with the teeth of the internal gear ring which is fixedly mounted on the support coaxially with the drive shaft, a gear segment coaxial with the second crank pin and freely rotatably mounted thereon and having teeth meshing with the teeth of an internal gear segment stationarily mounted on the support means coaxial with the driven shaft, and connecting means connecting an eccentric portion of the gear to an eccentric portion of the gear segment for transmitting a drive from the gear to the gear segment.

The drive shaft and the driven shaft are preferably coaxially arranged with each other and the connecting means preferably comprise a drive pin fixed eccentrically to the gear and projecting therefrom into a recess eccentrically arranged in the gear segment. This arrangement provides for the highly advantageous result that the inertia forces acting on the various elements of the mechanism vary relatively little during each operating cycle of the mechanism so that impacts or excessive stresses on the components of the mechanism are avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a cross-section taken along the line A—A of FIG. 2 and viewed in the direction of the arrows III—III;

FIG. 4 is a cross-section taken along the line A—A of FIG. 2 and viewed in the direction of the arrows IV—IV;

DESCRIPTION OF THE PREFERRED EMBODIMENTS

Figure 2:
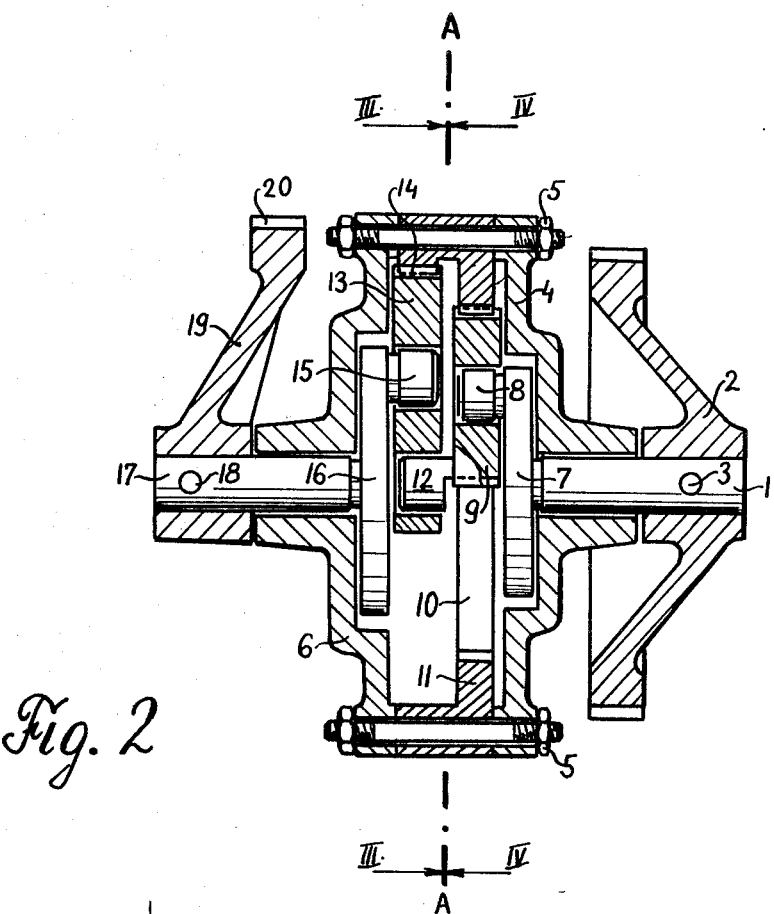
FIG. 2 is an axial cross-section through the mechanism according to the present invention.

Referring now to the drawing, and more specifically to FIGS. 2–4 of the same, it will be seen that the mechanism according to the present invention for transforming a unidirectional continuous rotary motion into an oscillating motion may comprise a drive shaft 1 and a driven shaft 17 coaxially mounted axially spaced from each other in bearings formed in hubs projecting in opposite direction from side wall plates 4 and 6 of a gear box forming support means for the various elements of the mechanism according to the present invention. A drive gear 2 is fixedly mounted by means of a cross pin 3 on the free outer end of the drive shaft 1 for rotation with the latter and the drive gear 2 is driven continuously and in one direction by drive means not shown in FIG. 2. First crank means comprising a disc 7, acting as a flywheel, and a pin 8 projecting from the disc and eccentrically arranged with respect to the axis of the drive shaft 1 are fixedly connected to the inner end of the drive shaft. A gear 9 is coaxially mounted on the crank pin 8 freely rotatable thereon. The teeth of the gear 9 are in mesh with the teeth of an internal gear ring 11 surrounding the gear 9, and the construction is made in such a manner that the radius of the pitch circle of the gear 9 equals the eccentricity of the crank pin 8 with regard to the axis of the drive shaft 1, whereas the diameter of the pitch circle of the internal gear ring 11 is twice the diameter of the pitch circle of the gear 9 so that during rotation of the drive shaft 1, the teeth of the gear 9 will remain in constant engagement with the teeth of the internal gear ring 11. In other words, during rotation of the drive shaft, the gear 9 will roll on the gear ring 11 while rotating about the axis of the crank pin 8. Second crank means comprising a disc 16, acting as a fly wheel, and a second crank pin 15 eccentrically arranged with respect to the axis of the driven shaft and projecting from the disc 16 towards the disc 7, are fixedly connected to the inner end of the driven shaft 17. A gear segment 13, of a configuration as best shown in FIG. 4, is coaxially arranged on the second crank pin 15 freely turnable thereon. The teeth of the gear segment 13 are in constant mesh with the teeth of an internal gear segment 14 of a configuration as best shown in FIG. 4. The gear segment 14 is arranged coaxially with the driven shaft 17 and has a larger pitch diameter than the internal gear ring 11. The gear ring 11 and the gear segment 14 may be integrally connected to each other and be connected to the plates 4 and 6 by screw bolts 5 extending through a plurality of aligned bores formed through the elements 4, 6 and 11 and 14 to thus form an enclosed gear box. Connecting means connect an eccentric portion of the gear 9 to an eccentric portion of the gear segment 13 for transmitting a drive from the gear to the gear segment, and these connecting means may comprise a pin 12 fixed eccentrically to the gear 9 and projecting therefrom into a cylindrical recess eccentrically arranged in the gear segment 13. A second gear segment 19 is mounted on the outer end of the driven shaft 17 and connected thereto for rotation therewith by a cross pin 18. The gear teeth 20 of the segment 19 may be in mesh with a gear, not shown in FIG. 2.

Figure 8:
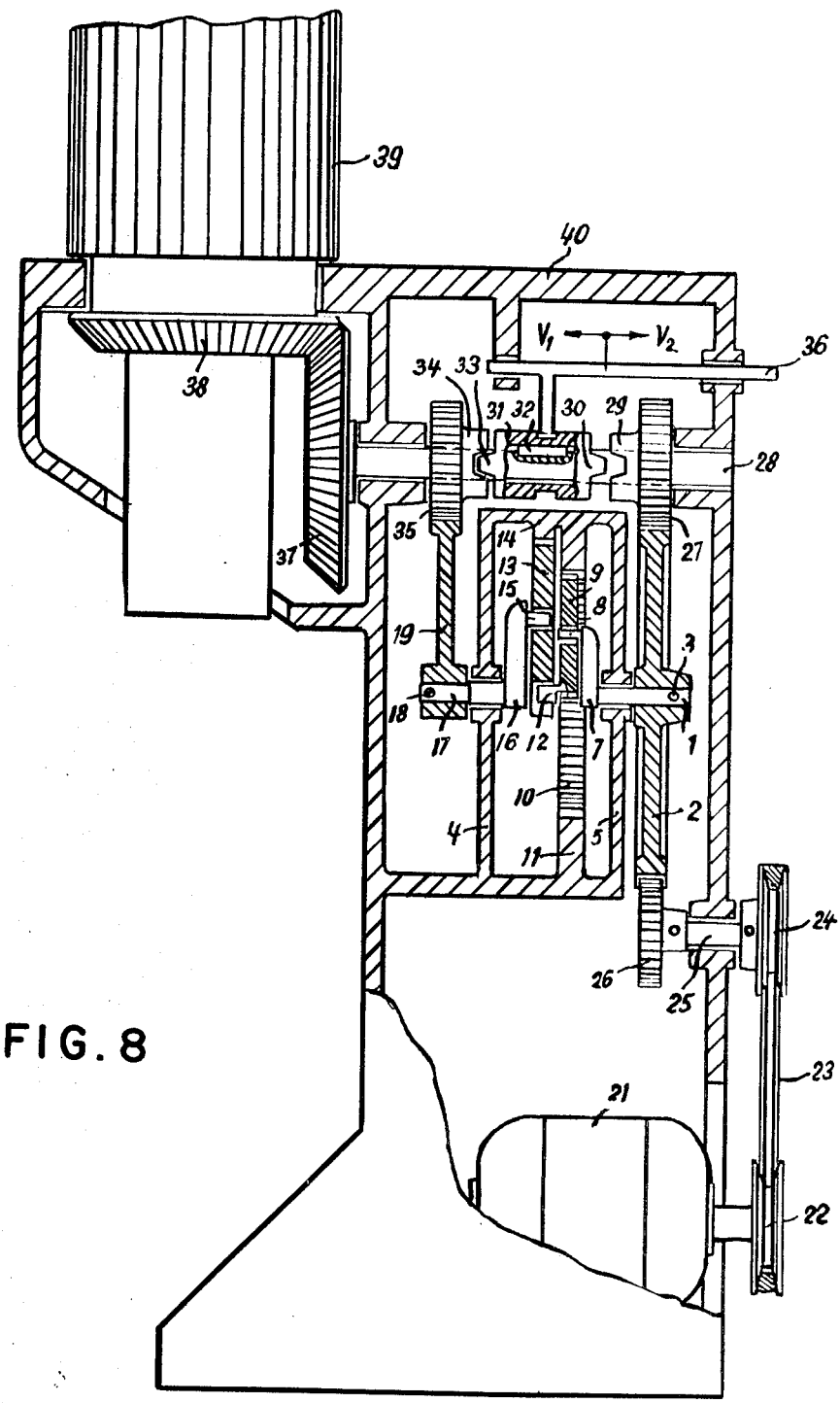
FIG. 8 is a partially sectioned schematic side view illustrating the mechanism according to the present invention incorporated in a circular knitting machine.

FIG. 8 schematically shows an arrangement in which the mechanism according to the present invention is used as drive mechanism for the needle cylinder of a circular knitting machine. The mechanism described in connection with FIGS. 2–4 is shown in simplified form in FIG. 8 and the elements above described are provided with the same reference numerals in FIG. 8. As shown in FIG. 8, the gear box formed by the above-described elements 4, 5, 11 and 14 and the elements mounted therein are carried by the main frame 40 of the machine. The gear 2 mounted on the outer end of the drvie shaft 1 is in mesh with a gear 26 mounted on the inner end of a shaft 25 which is turnably supported in an appropriate bearing in the machine frame 40. The shaft 25 carries at its outer end a pulley 24 connected by a belt 23 to a pulley 22 on the drive shaft of an electric motor 21 mounted on the base of the machine frame 40 so that the drive shaft 1 may be driven from the electric motor 21. A main shaft 28 extending parallel to the shafts 1 and 17 is rotatably mounted in appropriate bearings of the machine frame 40 above the aforementioned gear box and shaft 28 carries freely rotatably thereon a pair of gears 27 and 35, the teeth of which are respectively in mesh with the teeth of the gear 2 and those of the gear segment 19. The hubs 29 and 34 of the gears 27 and 35 are respectively formed with coupling recesses into which the coupling teeth 30 and 33 of a coupling member 31 mounted on the shaft 28 and connected thereto for rotation therewith by means of a slide key 32, may be engaged when the coupling member 31 is moved by the control rod 36 either in the direction indicated by the arrow $V_1$ or in the direction indicated by the arrow $V_2$. Movement of the control rod 36 is derived from a pattern drum of the circular knitting machine, not shown in the drawing. A bevel gear 37 mounted on the left end, as viewed in FIG. 8, of the shaft 28 for rotation therewith meshes with a bevel gear 38 fixed to the shaft of the schematically illustrated needle cylinder 39 of the knitting machine.

The apparatus shown in FIG. 8 will operate as follows:

When the control rod 36 is moved in the direction of the arrow $V_2$ so that the tooth 30 of the clutch member 31 is engaged in the recess of the hub 29 of the gear 27, the main shaft 28 will be connected through the gears 27, 2 and 26 and over the belt drive 24, 23, 22 to the drive shaft of the motor 21 and the needle cylinder 39, connected to the shaft 28 by the gears 37 and 38, will be constantly rotated in one direction. When the rod 36 is moved in the direction of the arrow $V_1$, so that the tooth 33 of the coupling member 31 is engaged in the recess of the hub 34 of the gear 35, while the gear 27, disconnected from the coupling member, can freely rotate on the shaft 28, then the mechanism of the present invention for transforming a unidirectional continuous rotary motion into an oscillating rotary motion is connected between the motor 21 and the needle cylinder 39, and the latter will be alternately oscillated about its axis in the manner as will now be described in connection with the schematic FIGS. 5–7.

Rotary motion in the direction of the arrow $S_1$ is transmitted to the drive shaft 1 (FIG. 5) by means of the driving gear 2 so that the crank 7 entrains by means of the crank pin 8 the gear 9, the teeth of which are in engagement with the teeth 10 of the internal gear ring 11 so that the gear 9 rolls on the internal gear ring 11, forming therewith an epicyclic gear, and rotates in the direction as indicated by the arrow $S_2$. During this movement of the gear 9, the drive pin 12, eccentrically fixed thereto, will move towards the right, as viewed in FIG. 5, as indicated by the arrow $P_1$, turning thereby the gear segment 13, which is turnably mounted on the second crank pin 15, in the direction of the arrow $S_4$, so that the gear segment 13 rolls on the internal gear segment 14. During this rolling motion of the gear segment 13, the crank 16 is entrained in the direction of the arrow $S_6$ by the second crank pin 15 and thus turns the driven shaft 17 and the gear segment 19 fixedly connected thereto in the same direction, which motion is transferred from the gear segment 19 to the gear 35 connected by the engaged coupling member 31 to the shaft 28 so that the needle cylinder 39 connected to the shaft 28 by the bevel gears 37 and 38 is turned in the corresponding direction.

Figure 5:
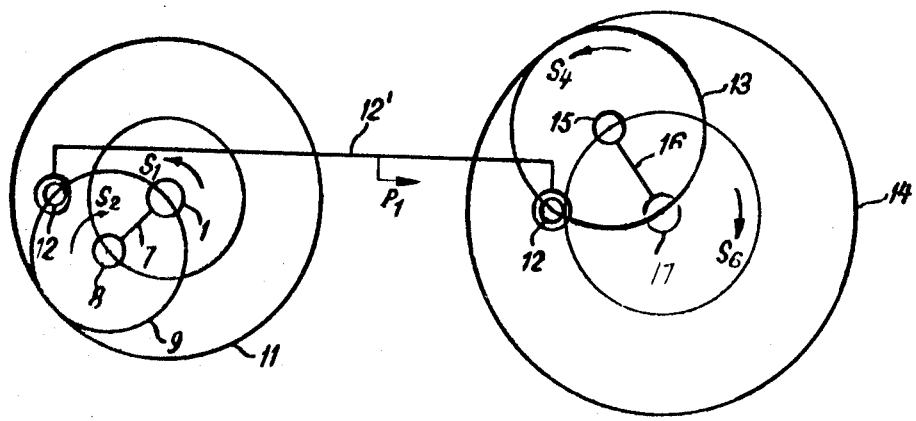
FIGS. 5–7 are diagrammatic views showing the various elements of the mechanism according to the present invention respectively in different angular positions.
Figure 6:
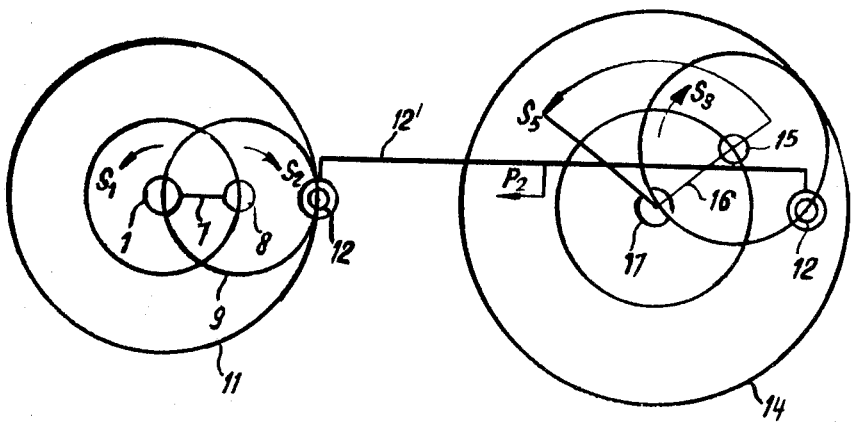
Figure 7:
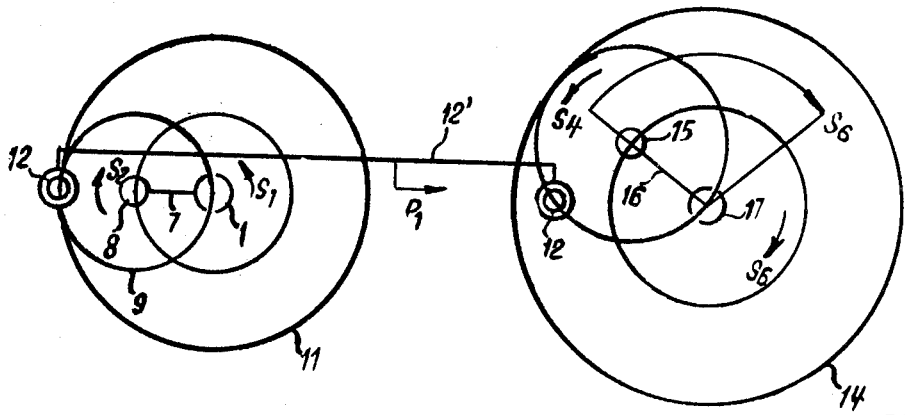

In the schematic FIGS. 5–7, in which the coaxial shafts 1 and 17 and the cranks mounted thereon are shown laterally displaced from each other, the drive pin 12 which connects the eccentric portion of the gear 9 with the eccentric portion of the gear segment 13 is schematically shown in two parts connected to each other by the line 12'.

In order to overcome the so-called "dead points" in the dead center positions which correspond to the change of direction of rotation of the needle cylinder, the toothing of the stationary internal gear segment 14 is provided, as shown in FIG. 4, on opposite sides with recesses 21 and 21a. At the moment at which the needle cylinder arrives at one of its dead centers and changes the direction of its rotation, the teeth of the gear segment 13 will enter for a short moment the recess 21a of the stationary internal gear segment 14 in such a manner that at this moment the teeth of the segment 13 will be out of mesh with the teeth of the internal stationary segment 14.

Upon further rotation of the drive shaft 1 (FIG. 6) in the direction of the arrow $S_1$, the dead point will be overcome and the pin 12 begins to advance in the direction of the arrow $P_2$ so that the gear segment 13 will rotate in the direction of the arrow $S_3$. Thereupon, the crank 16 is entrained by the pin 15 in the direction of arrow $S_5$, that is in the opposite direction as before, to thereby entrain the gear segment 19 fixed to the driven shaft 17 also in the opposite direction thus reversing the rotation of the needle cylinder 39. This reverse movement is continued until the gear segment 13 arrives at the other dead center, i.e. at the recess 21 of the stationary internal gear segment 14, whereafter the above-described cycle is repeated.

Figure 1:
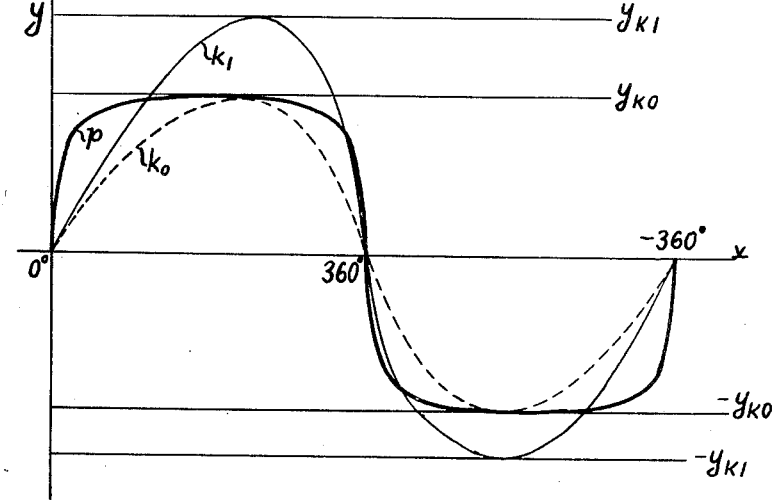
FIG. 1 shows a plurality of graphs plotting the degrees of rotation of a needle cylinder in relationship to the angular velocity thereof.

The angular velocity of the needle cylinder in relationship to the degree of rotation thereof is shown in the curve $p$ illustrated in FIG. 1. As can be seen from this curve, the angular velocity of the needle cylinder, when driven by the mechanism according to the present invention, rises rapidly to the maximum permissible angular velocity $y_{k0}$ at which a reliable operation of the knitting machine can still be carried out and remains substantially at this maximum permissible angular velocity during rotation of the needle cylinder in one direction to drop thereafter rapidly to zero velocity after which the rotation of the needle cylinder is reversed. In the curve $p$ shown in FIG. 1, the angular displacement of the needle cylinder in one direction is shown to be carried out through an angle of 360° and the reverse movement is also carried out through the same angle. This, however, will depend on the gear transmission ratio between the segment 19 and the gear 35 on the shaft 28, as well as on the radio of the bevel gears 37 and 38. If the ratio is chosen properly, the needle cylinder will make a full revolution in one direction as well as in the oposite direction. Evidently, the gear ratio may be chosen differently in which case the needle cylinder will rotate through an angle smaller than 360° in the one and the other direction. FIG. 1 shows also a curve $k_0$ showing the ratio of angular velocity and degrees of rotation of the needle cylinder when the motion of the needle cylinder 39 would be arrived by means of a known crank mechanism controlling the swinging motion of the segment 19. This known crank mechanism, which is not shown in the drawing, comprises essentially a driving gear which is provided with an eccentrically mounted pin connected by a tie rod with an eccentric pin on a gear segment 19. As evident from the curve $k_0$ the needle cylinder operated by this known mechanism according to the prior art would reach its maximum permissible angular velocity $y_{k0}$ much later than with the mechanism according to the invention, which evidently would reduce the efficiency of the knitting machine. In order to achieve with this known crank mechanism the same efficiency as is derivable with the mechanism according to the present inention, the needle cylinder would have to be operated with a maximum angular velocity $y_{k1}$, as indicated by the curve $k_1$, but such a maximum angular velocity would be beyond the range at which a reliable operation of the knitting machine can be carried out.

From the above-described operation of the mechanism according to the present invention, it will also be evident that the mechanism may also be used for transforming a continuous rotary motion into an intermittently reversing substantially linear motion by using the motion of the drive pin 12 which moves in the direction of the arrows $P_1$ and $P_2$.

It will be understood that each of the elements described above, or two or more together, may also find a useful application in other types of mechanism for transforming unidirectional continuous rotary motion into an oscillating mation, differing from the types described above.

While the invention has been illustrated and described as embodied in a mechanism for transforming unidirectional continuous rotary motion into an oscillating rotary or substantially linear motion, it is not intended to be limited to the details shown, since various modifications and structural changes may be made without departing in any way from the spirit of the present invention.

What is claimed as new and desired to be protected by Letters Patent is set forth in the appended claims:

1. A mechanism for transforming a unidirectional continuous rotary motion into an oscillating motion, comprising, in combination, support means; a rotary drive shaft and a driven shaft turnably mounted on said support means; first crank means fixed to said drive shaft and having a first crank pin eccentrically arranged with respect to the axis of said drive shaft; second crank means fixed to said driven shaft and having a second crank pin eccentrically arranged with respect to the axis of said driven shaft; a gear coaxial with said first crank pin and freely rotatably mounted thereon; and internal gear ring coaxial with said drive shaft and stationarily mounted on said support means and having teeth in mesh with the teeth of said gear; a gear segment coaxial with said second crank pin and freely rotatably mounted thereon; an internal gear segment stationarily mounted on said support means coaxial with said driven shaft and having teeth in mesh with said gear segment; and connecting means connecting an eccentric portion of said gear to an eccentric portion of said gear segment for transmitting a drive from said gear to said gear segment.

2. A mechanism as defined in claim 1, wherein said drive shaft and said driven shaft have adjacent ends spaced from each other and wherein said first and said second crank means are respectively fixed to said adjacent ends of said shafts.

3. A mechanism as defined in claim 2, wherein said shafts are coaxially arranged with each other.

4. A mechanism as defined in claim 3, wherein said connecting means comprise a drive pin fixed eccentrically to said gear and projecting therefrom into a recess eccentrically arranged in said gear segment.

5. A mechanism as defined in claim 4, wherein the eccentricity of said first crank pin is equal to the radius of the pitch circle of said gear and equal to one-half of the radius of the pitch circle of said stationary gear ring.

6. A mechanism as defined in claim 5, wherein the diameter of the pitch circle of said internal gear ring is smaller than the diameter of the pitch circle of said internal gear segment.

7. A mechanism as defined in claim 3, wherein said support means form part of a gear housing in which said first and said second crank means, said gear and said gear segment are arranged.

8. A mechanism as defined in claim 3, wherein said first and said second crank means each comprise a disc coaxially mounted on said respective shaft and said first and said second crank pin project from the disc of one crank means towards the disc of the other crank means.

9. A mechanism as defined in claim 1 and including a needle cylinder of a circular knitting machine operatively connected to said driven shaft.

10. A mechanism as defined in claim 4 and including a driven gear fixed to said drive shaft, motor means, transmission means between said motor means and said drive gear, a second gear segment fixed to said driven shaft, a main shaft turnably mounted in said support means and extending parallel to said drive shaft, a pair of additional gears respectively in mesh with said drive gear and said gear segment, said additional gears being coaxially mounted on said main shaft freely rotatable with respect thereto, coupling means for selectively coupling one or the other of said additional gears to said main shaft for rotation therewith a rotary needle cylinder, and transmission means between said main shaft and said rotary needle cylinder for driving the latter during rotation of said main shaft.

References Cited

UNITED STATES PATENTS

| | | | |
|---|---|---|---|
| 2,178,443 | 10/1939 | Wallace | 74—803 |
| 2,860,499 | 11/1958 | Marum | 66—56 |
| 3,418,858 | 12/1968 | Minnich | 74—436 |
| 3,427,830 | 2/1969 | Uhlir | 66—56 |

WESLEY S. RATLIFF, Jr., Primary Examiner

U.S. Cl. X.R.

74—25, 803